(12) United States Patent
Tsutsumi et al.

(10) Patent No.: US 9,487,072 B2
(45) Date of Patent: Nov. 8, 2016

(54) ANTI-VIBRATION DEVICE AND ANTI-VIBRATION DEVICE BRACKET

(75) Inventors: Tatsuya Tsutsumi, Yokohama (JP); Keita Nishikawa, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 5 days.

(21) Appl. No.: 13/995,362

(22) PCT Filed: Feb. 10, 2012

(86) PCT No.: PCT/JP2012/053176
§ 371 (c)(1),
(2), (4) Date: Jul. 17, 2013

(87) PCT Pub. No.: WO2012/111573
PCT Pub. Date: Aug. 23, 2012

(65) Prior Publication Data
US 2013/0313399 A1  Nov. 28, 2013

(30) Foreign Application Priority Data
Feb. 18, 2011  (JP) .................................. 2011-033831

(51) Int. Cl.
| | |
|---|---|
| *B60K 5/12* | (2006.01) |
| *F16M 5/00* | (2006.01) |
| *F16F 13/10* | (2006.01) |

(52) U.S. Cl.
CPC .......... *B60K 5/1208* (2013.01); *B60K 5/1291* (2013.01); *F16F 13/10* (2013.01); *F16M 5/00* (2013.01); *F16F 2230/0023* (2013.01)

(58) Field of Classification Search
CPC ............................... F16M 5/00; B60K 5/1208
USPC ....................................... 267/140.11, 140.13
See application file for complete search history.

(56) References Cited

U.S. PATENT DOCUMENTS 5,775,666 A * 7/1998 Tsukamoto et al. ..... 267/140.13
5,964,456 A * 10/1999 Someya .................. F16F 13/10
                                                           267/140.13
(Continued)

FOREIGN PATENT DOCUMENTS

EP       2095986 A1 *  9/2009  ........... B60K 5/1208
JP       10-213174 A      8/1998
(Continued)

*Primary Examiner* — Joshua J Michener
*Assistant Examiner* — Chiedu Chibogu
(74) *Attorney, Agent, or Firm* — Sughrue Mion, PLLC

(57) ABSTRACT

An anti-vibration device bracket is provided that is capable of suppressing deformation due to contact with a member coupled to an engine side, and also capable of suppressing liquid ingress from the engine side.
A anti-vibration device bracket 70 supports an anti-vibration device main body 12 on a vehicle body, the anti-vibration device main body 12 including an inside attachment member 14 coupled to an engine bracket 90, an outside attachment member 16 coupled to the vehicle body, and a resilient body 18 that couples together the inside attachment member 14 and the outside attachment member 16. The anti-vibration device bracket 70 includes a case 74 that is coupled to the vehicle body, that houses the anti-vibration device main body 12, to which the outside attachment member 16 is fixed, and that is open at a side portion on an opposite side to the bracket 90 extension side, and a upper plate portion 78 that configures an upper portion of the case 74, that is formed with a through hole 80 through which passes the inside attachment member 14 that is coupled to the bracket 90 at the outside of the case 74, that is formed with an upper face 78A facing the bracket 90 to the outside of the case 74, and that is formed with a lower face 78B facing an extension portion 22 of the inside attachment member 14 toward an inner side of the case 74.

6 Claims, 9 Drawing Sheets

(56) References Cited

U.S. PATENT DOCUMENTS

| | | | |
|---|---|---|---|
| 6,267,362 B1* | 7/2001 | Satori et al. | 267/140.13 |
| 6,357,731 B1* | 3/2002 | Tanahashi | 267/140.4 |
| 8,104,749 B2* | 1/2012 | Okumura et al. | 267/140.13 |
| 2002/0140144 A1* | 10/2002 | Hibi et al. | 267/140.13 |
| 2004/0119215 A1* | 6/2004 | Nanno et al. | 267/140.13 |
| 2004/0188903 A1* | 9/2004 | Goto et al. | 267/140.13 |
| 2005/0206056 A1* | 9/2005 | Maeno et al. | 267/140.13 |
| 2007/0001355 A1* | 1/2007 | Maeno et al. | 267/140.13 |
| 2010/0264570 A1* | 10/2010 | Thierry | F16F 1/36 267/141 |
| 2010/0275588 A1* | 11/2010 | Kamata | B60K 5/1208 60/322 |
| 2012/0267184 A1* | 10/2012 | Joly | F16F 1/373 180/291 |

FOREIGN PATENT DOCUMENTS

| | | | | |
|---|---|---|---|---|
| JP | 2000220686 A | * | 8/2000 | F16F 13/08 |
| JP | 2000220687 A | * | 8/2000 | F16F 13/08 |
| JP | 2008-128376 A | | 6/2008 | |
| JP | 2008-128410 A | | 6/2008 | |
| JP | 2009047207 A | * | 3/2009 | |
| JP | 2010216629 A | * | 9/2010 | |

* cited by examiner

ANTI-VIBRATION DEVICE AND ANTI-VIBRATION DEVICE BRACKET

CROSS REFERENCE TO RELATED APPLICATIONS

This application is a National Stage of International Application No. PCT/JP2012/053176 filed Feb. 10, 2012, claiming priority based on Japanese Patent Application No. 2011-033831, filed Feb. 18, 2011, the contents of all of which are incorporated herein by reference in their entirety.

TECHNICAL FIELD

The present invention relates to an anti-vibration device employed as an engine mount in general industrial machinery and vehicles to absorb vibration from an engine and suppress transmission of vibration to a vehicle body, and also to an anti-vibration device bracket employed with the anti-vibration device.

BACKGROUND ART

Anti-vibration devices are disposed as an engine mount between an engine that is a vehicle vibration generation section, and a vehicle body that is a vibration receiving section. The anti-vibration device absorbs vibration generated by the engine, and suppresses transmission of vibration to the vehicle body side. Known anti-vibration devices include for example a sealed-liquid type provided with a resilient body and a pair of liquid chambers inside the anti-vibration device, the liquid chambers being in communication with each other through an orifice that acts as a limiting path. According to such a sealed-liquid type anti-vibration device, when the engine mounted to the anti-vibration device is started up and vibration occurs, vibration is absorbed, such as by the vibration damping function of the resilient body and by viscous resistance of the liquid inside the orifice that communicates the pair of liquid chambers with each other, thereby suppressing vibration transmission to the vehicle body side (see for example Patent Document 1).

Patent Document 1 discloses technology wherein a portion of an engine bracket (coupling member) that couples together an anti-vibration device and an engine is enclosed by a displacement restriction member, with displacement of the engine with respect to the vehicle body through the engine bracket being restricted in the vehicle up-down direction (the main vibration input direction of the anti-vibration device), the vehicle front-rear direction and the vehicle width direction due to contact between a stopper rubber attached to the engine bracket and the displacement restriction member.

Patent Document 1: Japanese Patent Application Laid-Open (JP-A) No. 2008-128410

DISCLOSURE OF INVENTION

Technical Problem

In Patent Document 1, the engine bracket extends towards the engine from an open portion of the displacement restriction member that is open towards the engine side. There are accordingly limitations to increasing the contact surface area between the stopper rubber and the displacement restriction member by extending the displacement restriction member further towards the engine side. There is therefore a possibility of deformation occurring in the displacement restriction member due to input from the engine side.

Moreover, since the open portion of the displacement restriction member is open towards the engine side, there is the possibility of, for example, rainwater ingress to the anti-vibration device side through the open portion of the displacement restriction member, and of rust occurring on metal components configuring the anti-vibration device, when rainwater or the like enters the engine room through for example air inlets.

In consideration of the above circumstances, an object of the present invention is to provide an anti-vibration device bracket capable of suppressing deformation due to contact with a member coupled on the engine side, and also capable of suppressing liquid ingress from the engine side, and to provide an anti-vibration device employing this anti-vibration device bracket.

Solution to Problem

An anti-vibration device bracket of a first aspect of the present invention is an anti-vibration device bracket that supports an anti-vibration device main body on a vehicle body, the anti-vibration device main body including an inside attachment member that extends towards an engine and is coupled to a coupling member coupled to the engine, an outside attachment member that is coupled to the vehicle body, and a resilient body that is disposed between the inside attachment member and the outside attachment member and that couples together the inside attachment member and the outside attachment member, the anti-vibration device bracket including: a case that is coupled to the vehicle body, that houses the anti-vibration device main body, and to which the outside attachment member is fixed, and that is open at a side portion on an opposite side to a coupling member extension side; and a displacement restriction portion that configures an upper portion or a lower portion of the case, that is formed with a through hole through which passes the inside attachment member that is coupled to the coupling member outside of the case, that is formed with a first displacement restriction face facing the coupling member toward an outer side of the case, and that is formed with a second displacement restriction face facing a portion of the inside attachment member toward an inner side of the case.

According to the anti-vibration device bracket of the first aspect of the present invention, the displacement restriction portion is formed with the first displacement restriction face facing the coupling member and the second displacement restriction face facing a portion of the inside attachment member. Main vibration input direction movement of the coupling member and the inside attachment member that are coupled to the engine side, with respect to the outside attachment member that is coupled to the vehicle body, is accordingly restricted.

Main vibration input direction displacement of the engine with respect to the vehicle body is accordingly restricted.

In the anti-vibration device bracket, the side portion on the opposite side (referred to below as the coupling member extension-opposite side) of the case to the coupling member extension side is open. The engine is accordingly not disposed over an extension line of the open portion of the case. The case of the anti-vibration device bracket can accordingly be extended further towards the open portion side (the coupling member extension-opposite side) than in a configuration wherein for example the engine is disposed over an extension line from an open portion of the case that is open on the coupling member extension side. Since the displacement restriction portion configuring the upper portion or the lower portion of the case is also extended towards the coupling member extension-opposite side accompanying such an extension of the case, the surface area of the first displacement restriction face and the second displacement restriction face are also increased. The contact surface area between the coupling member and the first displacement restriction face is increased, and the contact surface area between the portion of the inside attachment member and the second displacement restriction face is also increased. Due to this increase in contact surface area, input to the displacement restriction portion due to contact with a member (the coupling member and the inside attachment member) coupled on the engine side can be distributed. Deformation of the displacement restriction portion, namely deformation of the anti-vibration device bracket, can accordingly be suppressed.

The anti-vibration device bracket is open at the side portion on the opposite side of the case to the coupling member extension side. Accordingly, moisture such as rainwater (liquid) that has entered the engine room is suppressed from entering the case from the engine side (from the outside) in comparison to configurations in which for example a side portion is open on the coupling member extension side of the case.

According to the anti-vibration device bracket of the first aspect of the present invention, deformation due to contact with a member coupled on the engine side can be suppressed, and liquid ingress from the engine side can also be suppressed.

An anti-vibration device bracket of a second aspect of the present invention is the anti-vibration device bracket of the first aspect, wherein the open portion of the case is formed with a flange portion that projects outward towards the outer side of the case.

The anti-vibration device bracket of the second aspect of the present invention is formed with the flange portion that projects out towards the case outside at the open portion of the case. The rigidity of the open portion of the case is accordingly increased.

An anti-vibration device bracket of a third aspect of the present invention is the anti-vibration device bracket of the second aspect, wherein the open portion of the case is formed such that a portion of the inside attachment member projects outward from the open portion as viewed along a main vibration input direction.

In the anti-vibration device bracket of the third aspect of the present invention, the open portion of the case is formed such that a portion of the inside attachment member projects out from the open portion as viewed along a main vibration input direction. Accordingly, when the inside attachment member is displaced with respect to the outside attachment member in a direction orthogonal to the main vibration input direction, the portion of the inside attachment member contacts the open portion of the case. Since the rigidity of the open portion of the case is increased by the flange portion, deformation of the case, namely deformation of the anti-vibration device bracket, due to contact with the inside attachment member can be suppressed.

An anti-vibration device bracket of a fourth aspect of the present invention is the anti-vibration device bracket of any one of the first aspect to the third aspect, wherein the second displacement restriction face is a flat face that extends in an opposite direction to the coupling member extension side.

In the anti-vibration device bracket of the fourth aspect of the present invention, the second displacement restriction face is a flat face that extends in the opposite direction to the coupling member extension side. Contact surface area with the inside attachment member can accordingly be secured, and input to the displacement restriction portion due to contact can be efficiently distributed.

An anti-vibration device of a fifth aspect of the present invention includes: an anti-vibration device main body including an inside attachment member that extends towards an engine and is coupled to a coupling member coupled to the engine, an outside attachment member that is coupled to a vehicle body, and a resilient body that is disposed between the inside attachment member and the outside attachment member and that couples together the inside attachment member and the outside attachment member; and the anti-vibration device bracket of any one of the first aspect to the fourth aspect which supports the anti-vibration device main body on the vehicle body.

The anti-vibration device of the fifth aspect of the present invention employs the anti-vibration device bracket of any one of the first aspect to the fourth aspect. Deformation of the anti-vibration device bracket due to contact with a member coupled on the engine side is accordingly suppressed, and liquid ingress to the anti-vibration device bracket from the engine side is also suppressed.

Advantageous Effects of Invention

As described above, the anti-vibration device bracket of the present invention is capable of suppressing deformation due to contact with a member coupled on the engine side, and also capable of suppressing liquid ingress from the engine side.

The anti-vibration device of the present invention is capable of suppressing deformation of the anti-vibration device bracket due to contact with a member coupled on the engine side, and also capable of suppressing liquid ingress to the anti-vibration device bracket from the engine side.

BEST MODE FOR CARRYING OUT THE INVENTION

Figure 1:
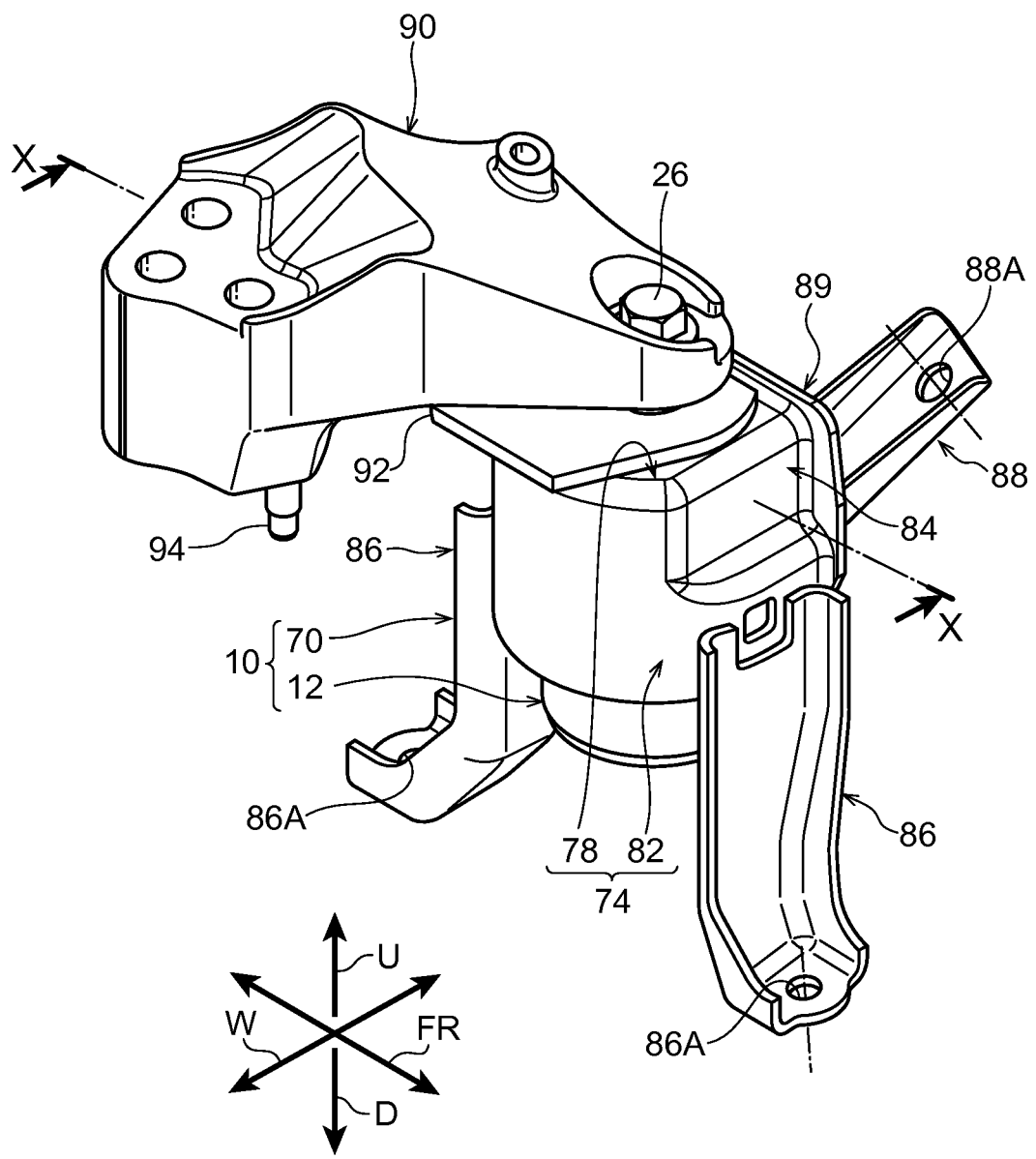
FIG. 1 is a perspective view illustrating an anti-vibration device of a first exemplary embodiment.

Explanation follows regarding an anti-vibration device and an anti-vibration device bracket according to exemplary embodiments of the present invention, with reference to the drawings.

First Exemplary Embodiment

FIG. 1 to FIG. 6 illustrate an anti-vibration device and an anti-vibration device bracket according to a first exemplary embodiment of the present invention. An anti-vibration device 10 is applied as an engine mount that supports a vehicle engine (not illustrated in the drawings) on a vehicle body (not illustrated in the drawings). In the drawings, S indicates the device axial center, with the direction along the axial center denoted the device axial direction S. In the present exemplary embodiment, in the drawings U and D respectively indicate the device up-down direction, and FR indicates a first direction that is orthogonal to the device up-down direction. In the drawings, W indicates a second direction that is orthogonal to both the device up-down direction and the first direction.

Note that the anti-vibration device 10 of the present exemplary embodiment is mounted to a vehicle such that the first direction is the vehicle front-rear direction and the second direction is the vehicle width direction, and so in the following explanation is given with the first direction reading as the vehicle front-rear direction and the second direction reading as the vehicle width direction.

Figure 2:
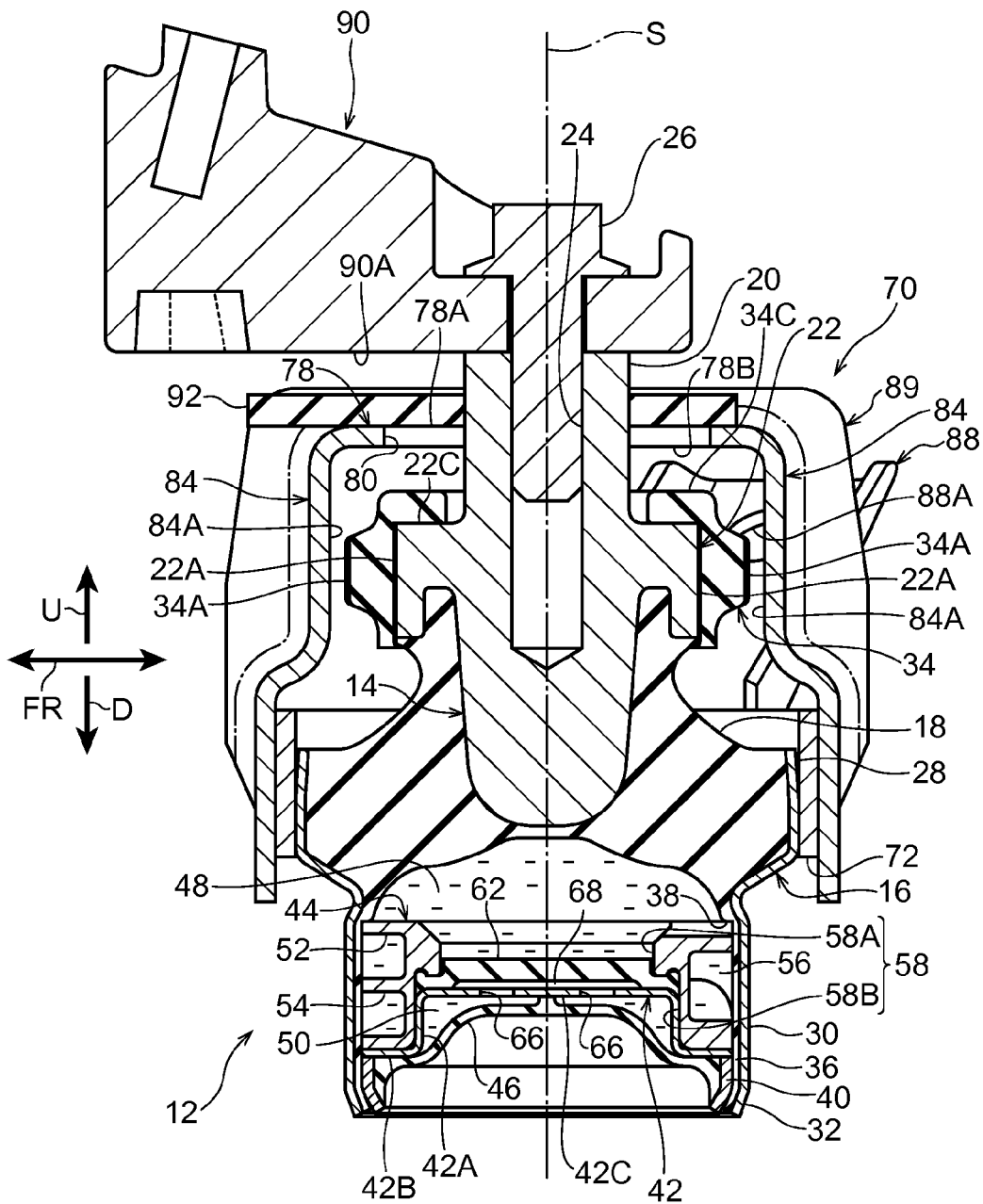
FIG. 2 is a cross-section taken along line X-X of FIG. 1.

As illustrated in FIG. 1 and FIG. 2, the anti-vibration device 10 of the present exemplary embodiment includes an anti-vibration device main body 12 and an anti-vibration device bracket 70 that supports the anti-vibration device main body 12 on the vehicle body.

As illustrated in FIG. 2, the anti-vibration device main body 12 is provided with an inside attachment member 14 formed from a metal material, an outside attachment member 16 formed from metal material as a thin-walled circular cylinder disposed at the peripheral outside of, and coaxially to, the inside attachment member 14, and a resilient body 18 that is made from rubber and acts as a vibration absorbing main body, and that is disposed between the inside attachment member 14 and the outside attachment member 16.

Figure 3:
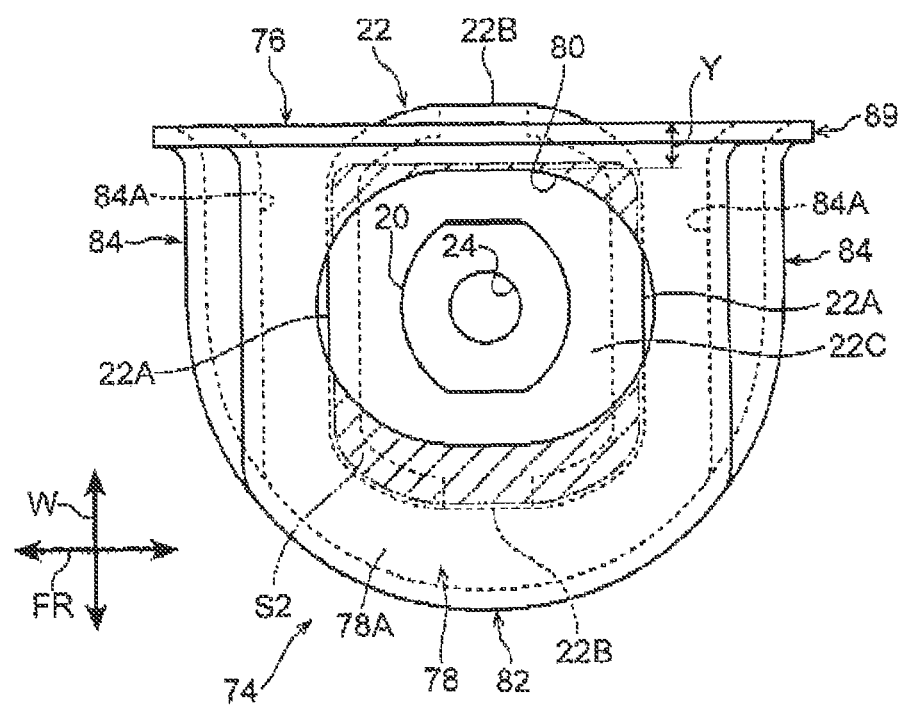
FIG. 3 is a plan view illustrating an anti-vibration device of the first exemplary embodiment.

The inside attachment member 14 is provided with a rod shaped cylinder portion 20 at an upper end side, and a thick circular plate shaped extension portion 22 is integrally provided to the inside attachment member 14 so as to extend from a lower end portion of the cylinder portion 20 towards the peripheral outside thereof. As illustrated in FIG. 3, vehicle front-rear direction outer peripheral faces 22A of the extension portion 22 are configured as flat faces running along the vehicle width direction, and vehicle width direction outer peripheral faces 22B are configured as substantially circular arc shaped faces that bulge towards the outsides.

As illustrated in FIG. 2, a threaded hole 24 is formed extending along the axial center S from an upper end face of the cylinder portion 20. A bolt 26 is screwed into the threaded hole 24. The inside attachment member 14 is coupled through the bolt 26 to an engine bracket 90 serving as an example of a coupling member extending towards the engine, thereby coupling the inside attachment member 14 to the engine.

An upper end side of the outside attachment member 16 configures a large diameter portion 28, and a lower end side of the outside attachment member 16 configures a small diameter portion 30 that has a smaller diameter than the large diameter portion 28. The large diameter portion 28 is fitted into and fixed to a circular ring shaped fixing ring 72 that is joined to a case 74 of the anti-vibration device bracket 70, described later. The small diameter portion 30 is formed with a crimped portion 32 that has a tapered shape of decreasing diameter on progression downwards towards a lower end portion.

The resilient body 18 is disposed between the inside attachment member 14 and the outside attachment member 16, to both of which the resilient body 18 is vulcanization bonded, thereby resiliently coupling together the inside attachment member 14 and the outside attachment member 16. A stopper rubber 34 made from rubber is moreover vulcanization bonded to the extension portion 22 of the inside attachment member 14, spanning across from an upper face 22C to the outer peripheral faces 22A, 22B. The stopper rubber 34 is integrally formed with the resilient body 18. The stopper rubber 34 is further configured including thick front/rear stopper rubber portions 34A that cover the outer peripheral faces 22A of the extension portion 22, thick width direction stopper rubber portions (not shown in the drawings) that cover the outer peripheral faces 22B, and a thick upper stopper rubber portion 34C that covers the upper face 22C of the extension portion 22.

The resilient body 18 is integrally formed with a thin membrane shaped covering portion 36 that extends downwards from a lower end portion of the resilient body 18. The covering portion 36 is vulcanization bonded to the inner peripheral face of the outside attachment member 16 and covers the inner peripheral face of the outside attachment member 16.

The resilient body 18 is further formed with a stepped portion 38 extending towards the outside attachment member 16 peripheral inside at the lower end portion of the resilient body 18. Inside the outside attachment member 16 there are inserted: a diaphragm ring 40 that is formed substantially in a thick circular plate shape, all of which is at a lower portion side of the stepped portion 38; a substantially hat-shaped membrane pressing member 42 disposed over the diaphragm ring 40; and a circular disk shaped orifice configuration member 44 disposed over the membrane pressing member 42. An outer peripheral portion of the top face of the orifice configuration member 44 is in contact with the stepped portion 38 of the resilient body 18.

The outside attachment member 16, inserted on the peripheral inside with the diaphragm ring 40, the membrane pressing member 42 and the orifice configuration member 44, is crimped towards the peripheral inside at the crimped portion 32. The diaphragm ring 40, the membrane pressing member 42 and the orifice configuration member 44 are accordingly fixed inside the outside attachment member 16 between the stepped portion 38 of the resilient body 18 and the crimped portion 32.

An outer peripheral portion of a rubber diaphragm 46 that is formed in an upwards protruding cup shape is vulcanization bonded around the entire periphery to the inner peripheral face of the diaphragm ring 40.

A liquid chamber space that is sealed from the outside by the outside attachment member 16, the resilient body 18 and the diaphragm 46 is formed inside the anti-vibration device main body 12. The liquid chamber space is partitioned into a main liquid chamber 48 towards the orifice configuration member 44, with the resilient body 18 configuring a portion of a boundary wall, and a secondary liquid chamber 50 with the diaphragm 46 configuring a portion of a boundary wall.

In the anti-vibration device main body 12, the space to the outside of the diaphragm 46 that forms a portion of the secondary liquid chamber 50 boundary wall is in communication with the outside, such that the diaphragm 46 is capable of undergoing resilient deformation such that the internal volume of the secondary liquid chamber 50 expands and contracts corresponding to changes in the amount of liquid inside the secondary liquid chamber 50. The internal volume of the main liquid chamber 48 moreover expands and contracts accompanying resilient deformation of the resilient body 18.

An upper level groove portion 52 and a lower level groove portion 54, each of recessed profile, are provided to the orifice configuration member 44 so as to extend around the outer peripheral face in the orifice configuration member 44 circumferential direction. One end portions of each of these groove portions 52, 54 are in communication with each other through a connection hole (not shown in the drawings). The orifice configuration member 44 is further formed with a first communication opening (not shown in the drawings) from the other end portion of the upper level groove portion 52 towards the peripheral inside (the axial center S side), and a second communication opening (not shown in the drawings) from the other end portion of the lower level groove portion 54 towards the peripheral inside. Note that the peripheral outsides of the groove portions 52, 54 are in pressing contact with and closed off by the inner peripheral face of the outside attachment member 16 through the covering portion 36, thereby configuring an orifice 56 that is a limiting path that places the main liquid chamber 48 and the secondary liquid chamber 50 in communication with each other.

Note that the insides of the main liquid chamber 48, the secondary liquid chamber 50 and the orifice 56 are filled with a liquid such as water, ethylene glycol, silicone oil, propylene glycol, or solutions or mixtures thereof. The liquid is capable of flowing between the main liquid chamber 48 and the secondary liquid chamber 50 through the orifice 56. The length and cross-sectional area of the orifice 56 are set (tuned) so as to be adapted for the amplitude and frequency of shake vibration.

A central portion of the orifice configuration member 44 is formed with a through hole 58 of circular cross-section profile. An upper end side of the through hole 58 is configured as a small diameter portion 58A, and a lower end side is configured as a large diameter portion 58B of larger diameter than the small diameter portion 58A. A cylinder portion 42A of the membrane pressing member 42 described above is inserted into the large diameter portion 58B. A flange portion 42B that projects out towards the peripheral outside from a lower end portion of the cylinder portion 42A of the membrane pressing member 42 is clamped by the diaphragm 46 between a lower end portion of the orifice configuration member 44 and an upper end portion of the diaphragm 46.

An edge portion of a substantially circular plate shaped membrane 62 configured by a rubber material clamped between two members, clamped between a stepped portion 58C on the orifice configuration member 44 between the small diameter portion 58A and the large diameter portion 58B, and an outer edge portion of a top plate portion 42C that blocks off an upper portion of the cylinder portion 42A of the membrane pressing member 42.

The top plate portion 42C of the membrane pressing member 42 is formed with plural open portions 66. A housing chamber 68 formed between the top plate portion 42C and the membrane 62 is in mutual communication with the secondary liquid chamber 50 through the open portions 66.

Anti-vibration Device Bracket

Figure 4:
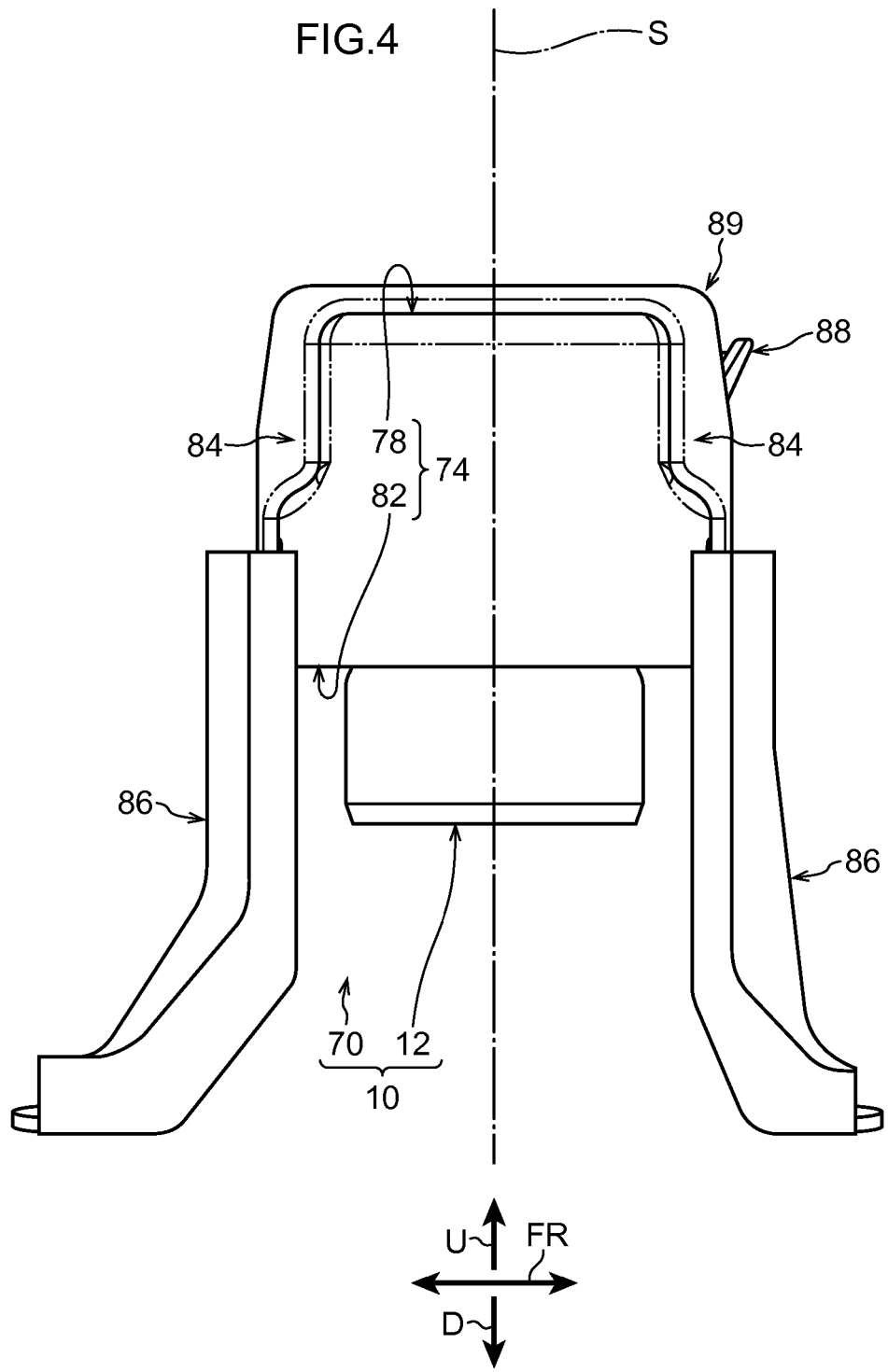
FIG. 4 is a side view of an anti-vibration device of the first exemplary embodiment as viewed from an engine side.

As illustrated in FIG. 1, FIG. 2 and FIG. 4, the anti-vibration device bracket 70 includes the case 74 that houses at least a portion of the anti-vibration device main body 12, and leg portions 86 and a stay member 88 that respectively fix the case 74 to the vehicle body. Note that the leg portions 86 are omitted from illustration in FIG. 2.

Figure 5:
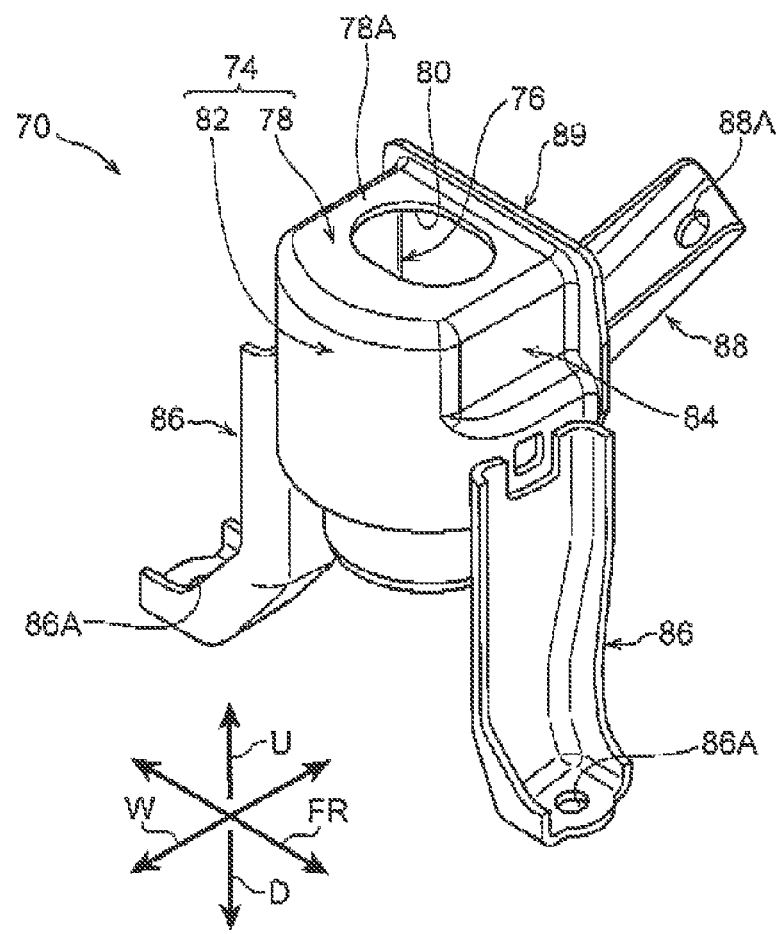
FIG. 5 is a perspective view illustrating an anti-vibration device bracket of the first exemplary embodiment.

As illustrated in FIG. 2 and FIG. 5, a side portion of the case 74 has an open configuration on the opposite side (referred to below as the engine-opposite side as appropriate) to the engine bracket 90 projection side (referred to below as the engine side as appropriate). Note that in the present exemplary embodiment, a lower portion of the case 74 is also open. The case 74 is configured including an upper plate portion 78 serving as an example of a displacement restriction portion, a side plate portion 82 that encloses the outer periphery of the anti-vibration device main body 12, and an open portion 76 of the case 74 described above.

The upper plate portion 78 is orthogonal to a main vibration input direction of the anti-vibration device main body 12 (the same direction as the axial direction S). A flat upper face 78A of the upper plate portion 78 faces a flat lower face 90A of the engine bracket 90, and a lower face 78B of the upper plate portion 78 faces the upper face 22C of the extension portion 22 of the inside attachment member 14. Note that the upper face 78A is a flat face serving as an example of a first displacement restriction face, and the lower face 78B is a flat face serving as an example of a second displacement restriction face.

The upper plate portion 78 is formed with a through hole 80 through which passes the cylinder portion 20 of the inside attachment member 14 that is coupled to the engine bracket 90 at the outside of the upper face 78A (above in FIG. 2). As illustrated in FIG. 3 and FIG. 5, the through hole 80 of the present exemplary embodiment is configured as an elongated hole that is longer in the vehicle front-rear direction. Moreover, as illustrated in FIG. 3, the vehicle front-rear direction length of the through hole 80 is longer than the vehicle front-rear direction length of the extension portion 22. Note that the stopper rubber 34 is omitted from illustration in FIG. 3.

As illustrated in FIG. 1 and FIG. 2, a plate shaped bound-stopper rubber 92 is disposed on the upper face 78A of the upper plate portion 78. The lower face 90A of the engine bracket 90 and the upper face 78A of the upper plate portion 78 contact each other through the bound-stopper rubber 92.

Figure 6:
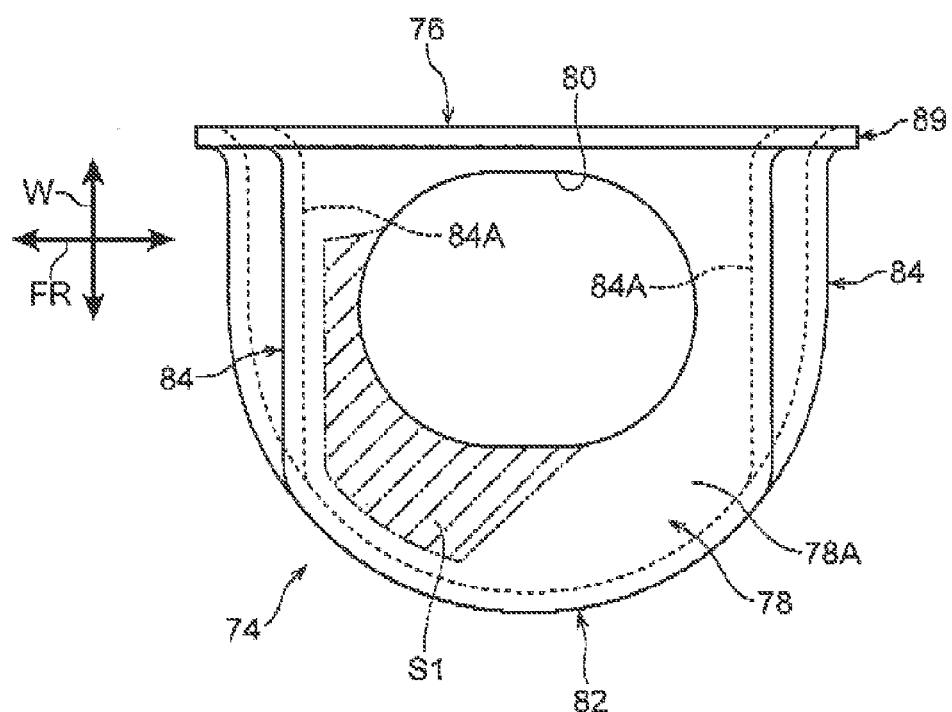
FIG. 6 is an upper face view illustrating an anti-vibration device bracket of the first exemplary embodiment.

Note that the double-dotted dashed line shaded region S1 in FIG. 6 illustrates the distribution of load (input in the main vibration direction) received by the upper plate portion 78 from the engine bracket 90. The double-dotted dashed line shaded region S2 in FIG. 3 illustrates the distribution of load (input in the main vibration direction) received by the upper plate portion 78 from the extension portion 22.

The side plate portion 82 is integrally formed with the upper plate portion 78. The side plate portion 82 is curved about the through hole 80 such that the engine side of the side plate portion 82 protrudes towards the engine side. Note that the side plate portion 82 forms a substantially C-shape as viewed along the main vibration input direction.

Moreover, as illustrated in FIG. 2, the fixing ring 72 described above is fitted into and joined to the open lower portion of the side plate portion 82. The outside attachment member 16 is thereby fixed to the side plate portion 82 through the fixing ring 72.

A pair of front/rear plate portions 84 of the side plate portion 82 face each other along the vehicle front-rear direction, and are each formed with a flat stopper face 84A extending along the vehicle width direction and contacting the front/rear stopper rubber portions 34A of the inside attachment member 14 at an upper portion inner face. The leg portions 86 that extend downwards at a lower portion outer face of the front/rear plate portions 84 are joined to the front/rear plate portions 84. The leg portions 86 are respectively formed with a coupling hole 86A at a leading end side, and are fastened and fixed to the vehicle body side by bolts (not shown in the drawings) that are inserted through the coupling holes 86A. The stay member 88 that extends towards for example a tire housing of the vehicle body is fixed to the outer peripheral face of a portion of the fixing ring 72 that is exposed by the case 74. A coupling hole 88A is formed at a leading end side of the stay member 88, and the stay member 88 is fastened and fixed to the vehicle body tire housing by a bolt (not shown in the drawings) inserted through the coupling hole 88A.

As illustrated in FIG. 3 and FIG. 5, the open portion 76 of the case 74 is formed with a flange portion 89 that projects towards the case 74 outside. The flange portion 89 of the present exemplary embodiment is configured by bending an end portion of the side plate portion 82 that configures the open portion 76 around towards the case 74 outside, bending an end portion of the upper plate portion 78 that configures the open portion 76 around towards the case 74 outside, with these two bent portions integrated together.

As illustrated in FIG. 3, the open portion 76 of the case is formed such that the extension portion 22 of the inside attachment member 14 projects out from the open portion 76 as viewed along the main vibration input direction.

Moreover, in the present exemplary embodiment, the case 74 and the flange portion 89 are formed by integrally drawing a metal material.

Explanation follows regarding operation of the anti-vibration device bracket 70 and the anti-vibration device 10 according to the first exemplary embodiment of the present invention configured as described above.

In the anti-vibration device 10, the upper plate portion 78 of the anti-vibration device bracket 70 is configured with the upper face 78A formed facing the engine bracket 90 and the lower face 78B formed facing the upper face 22C of the extension portion 22 of the inside attachment member 14. Main vibration input direction movement of the engine bracket 90 and the inside attachment member 14 that are coupled to the engine side, with respect to the outside attachment member 16 that is attached to the vehicle body side, is accordingly restricted by contact through the bound-stopper rubber 92 and contact through the stopper rubber 34 respectively. Main vibration input direction displacement of the engine with respect to the vehicle body is accordingly restricted.

In the anti-vibration device bracket 70, the side portion of the case 74 on the extension-opposite side (engine-opposite side) of the engine bracket 90 is open, configuring the open portion 76. The engine is accordingly not disposed over an extension line of the open portion 76 of the case 74. In the anti-vibration device bracket 70, the case 74 can accordingly be extended further (for example extending the length indicated by Y in FIG. 3) towards the open portion 76 side (engine-opposite side) than in a configuration wherein for example the engine is disposed over an extension line from an open portion of the case 74 that is open on the engine bracket 90 extension side. Since the upper plate portion 78 configuring the upper portion of the case 74 is also extended towards the engine-opposite side accompanying such an extension of the case 74, the surface area of the upper face 78A and the lower face 78B are also increased. The contact surface area between the lower face 90A of the engine bracket 90 and the flat upper face 78A through the bound-stopper rubber 92, and the contact surface area between the upper face 22C of the extension portion 22 of the inside attachment member 14 and the flat lower face 78B through the stopper rubber 34 are accordingly also increased. Due to this increase in contact surface area, input to the upper plate portion 78 due to contact with the engine bracket 90 and the inside attachment member 14 that are coupled to the engine side can be distributed. Deformation of the upper plate portion 78, namely deformation of the anti-vibration device bracket 70, can accordingly be suppressed.

Moreover, the front/rear plate portions 84 of the side plate portion 82 are also extended towards the engine-opposite side accompanying extension of the case 74. The stopper faces 84A are accordingly extended, and the contact surface area between the stopper faces 84A and the outer peripheral faces 22A of the extension portion 22 through the stopper rubber 34 is accordingly increased. Input to the front/rear plate portions 84 due to contact with the extension portion 22 can accordingly be distributed, and deformation of the front/rear plate portions 84, namely deformation of the anti-vibration device bracket 70, can accordingly be suppressed.

Moreover, in the anti-vibration device bracket 70 the side portion is open on the engine-opposite side of the case 74, forming the open portion 76. Accordingly, moisture such as rainwater (liquid) that has entered the engine room is suppressed from entering the case 74 from the engine side (from the outside) in comparison to a configuration in which a side portion is open on the engine side of the case 74 to form an open portion. The occurrence of rust on metal components configuring the anti-vibration device main body 12 is accordingly suppressed.

As described above, deformation of the anti-vibration device bracket 70 due to contact with the engine bracket 90 and the inside attachment member 14 that are coupled to the engine side can be suppressed. Liquid can also be suppressed from entering from the engine side.

Moreover, due to employing such an anti-vibration device bracket 70, durability of the anti-vibration device 10 is increased. The stopper rubber 34 and the bound-stopper rubber 92 employed in the anti-vibration device 10 distribute input during contact due to the increased contact surface area, thereby extending product life.

The side plate portion 82 of the case 74 curves such that the engine side of the side plate portion 82 protrudes towards the engine side, thereby increasing rigidity in the main vibration input direction.

Moreover, the rigidity of the open portion 76 of the case 74 is increased due to forming the flange portion 89 at the open portion 76 of the case 74 so as to project out towards the case 74 outside.

Moreover, as illustrated in FIG. 3, in the anti-vibration device bracket 70 as viewed along the main vibration input direction, the open portion 76 of the case 74 is formed such that the extension portion 22 of the inside attachment member 14 projects out from the open portion 76. Accordingly, when the inside attachment member 14 is displaced with respect to the outside attachment member 16 in a direction orthogonal to the main vibration input direction, in the vehicle front-rear direction in the current example, the extension portion 22 contacts the stopper faces 84A and the open portion 76 of the case 74 through the stopper rubber 34. Since the rigidity of the open portion 76 of the case 74 is increased by the flange portion 89, deformation of the case 74, namely deformation of the anti-vibration device bracket 70, due to contact with the inside attachment member 14 can be suppressed.

In the anti-vibration device bracket 70, the case 74 and the flange portion 89 are formed by integrally drawing a metal material. The strength of the anti-vibration device bracket 70 can accordingly be increased in comparison to configurations in which for example the case 74 is not formed by integrally drawing a metal material.

Figure 7:
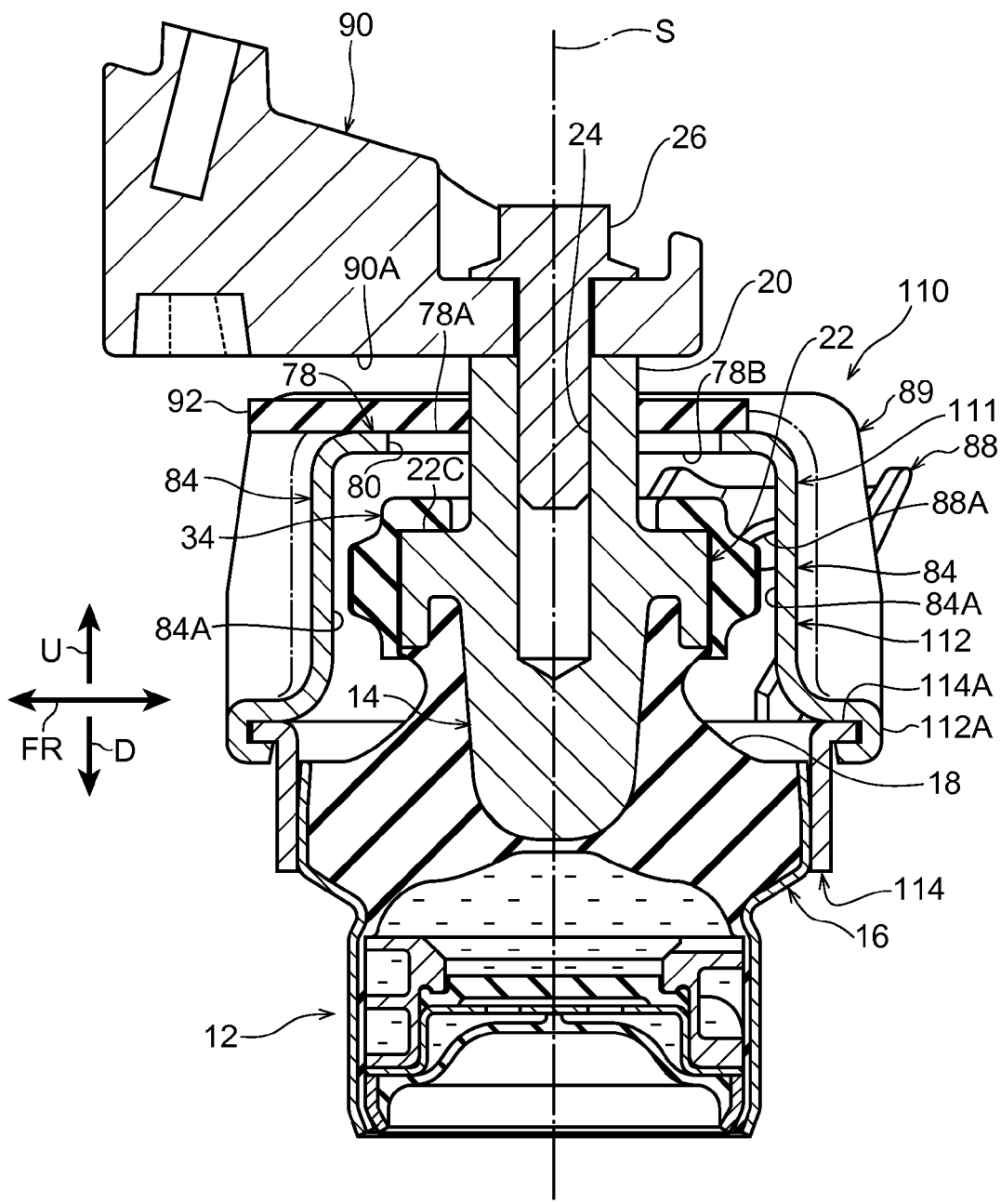
FIG. 7 is a side cross-section illustrating a configuration of an anti-vibration device of a second exemplary embodiment.

As illustrated in FIG. 3, in the anti-vibration device bracket 70 of the first exemplary embodiment, the fixing ring 72 into which anti-vibration device main body 12 is fitted is fixed to the lower portion of the side plate portion 82 of the case 74, however the present invention is not limited to such a configuration. Configuration may be made such as shown by an anti-vibration device bracket 110 of a second exemplary embodiment illustrated in FIG. 7, wherein a flange portion 114A is formed projecting to the peripheral outside at an upper end portion of a ring shaped fixing ring 114, into which is fitted an anti-vibration device main body 12. A lower end portion 112A of a side plate portion 112 of a case 111 is bent around so as to surround the flange portion 114A, and the side plate portion 112 and the fixing ring 114 are fixed so as to be coupled together.

Figure 8:
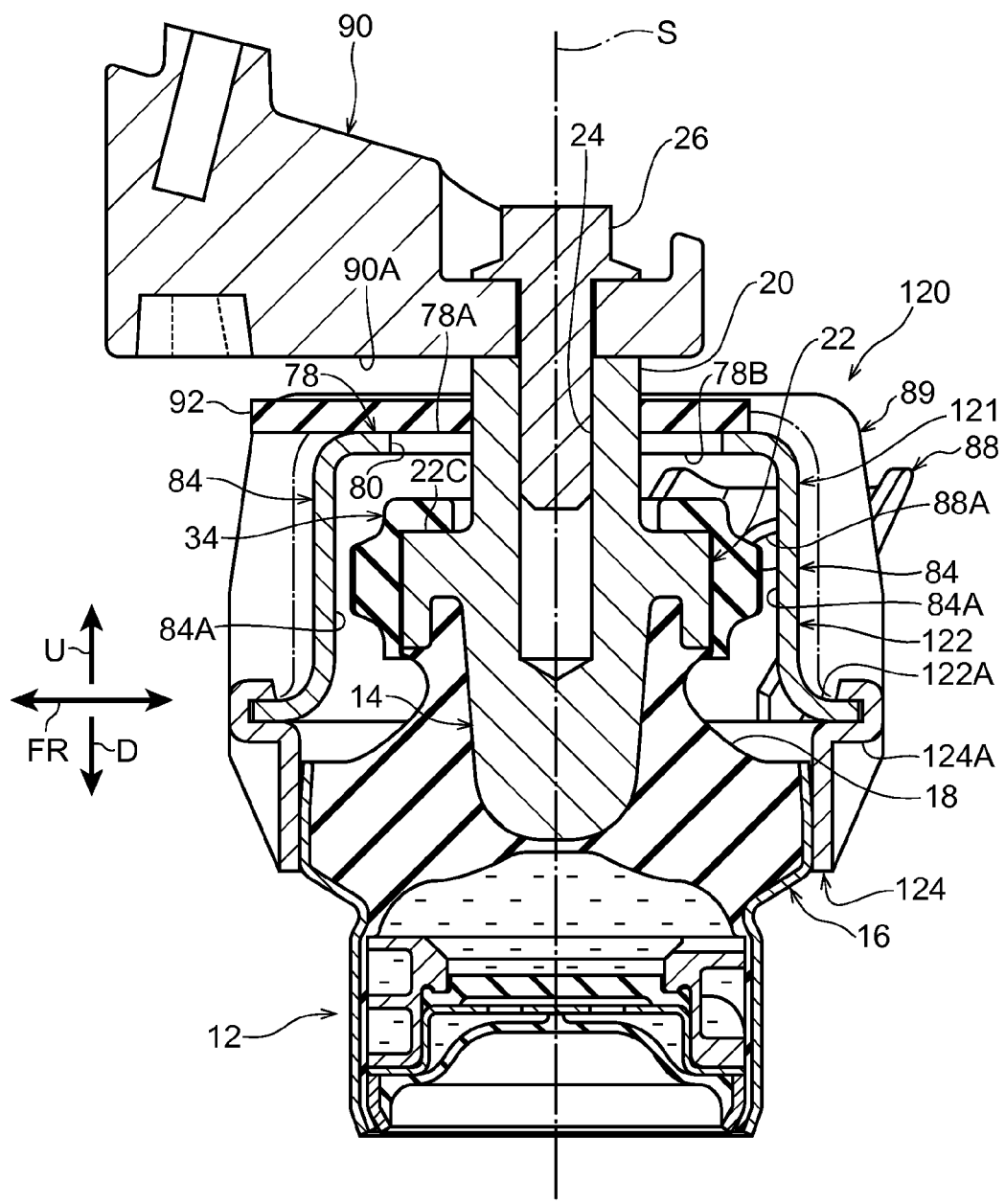
FIG. 8 is a side cross-section illustrating a configuration of a modified example of an anti-vibration device of the second exemplary embodiment.

Moreover, as shown by an anti-vibration device bracket 120 of a modified example of the second exemplary embodiment illustrated in FIG. 8, configuration may be made wherein a lower end portion of a side plate portion 122 of a case 121 is bent around towards the peripheral outside to form a flange portion 122A, an upper end portion 124A of a ring shaped fixing ring 124 into which an anti-vibration device main body 12 is fitted into is bent around so as to surround the flange portion 122A, and the side plate portion 122 and the fixing ring 124 are fixed so as to be coupled together.

Figure 9:
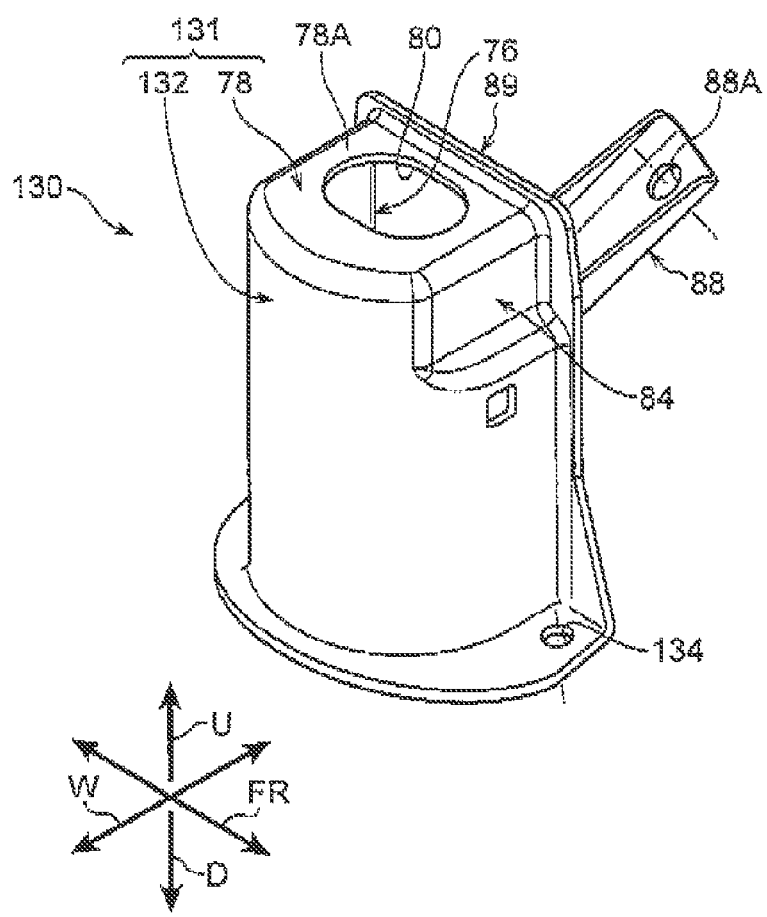
FIG. 9 is a perspective view illustrating an anti-vibration device bracket of another exemplary embodiment.

As illustrated in FIG. 1, the anti-vibration device bracket 70 of the first exemplary embodiment is configured with the pair of leg portions 86 joined to the case 74, however the configuration of the present invention is not limited thereto. Configuration may be made such as in an anti-vibration device bracket 130 of another exemplary embodiment illustrated in FIG. 9, wherein a lower end portion of a side plate portion 132 of a case 131 is bent around to the case 131 outside, coupling holes 134 are formed in this bent around portion, and the case 131 and the vehicle body are fixed so as to be coupled together using bolts. The anti-vibration device bracket 70, 110, 120, 130 described above may also be attached with the up and down directions reversed.

Explanation has been given above of embodiments of the present invention using examples of exemplary embodiments, however these exemplary embodiments are merely examples and various modifications may be implemented within a range not departing from the spirit of the invention. Obviously the scope of rights of the present invention is not limited to the exemplary embodiments described above.

The invention claimed is:

1. An anti-vibration device bracket that is for supporting an anti-vibration device main body that is to be on a vehicle body, the anti-vibration device main body comprising an inside attachment member that is to extend towards an engine and is to be coupled to a coupling member coupled to the engine, an outside attachment member that is to be coupled to the vehicle body, and a resilient body that is disposed between the inside attachment member and the outside attachment member and that couples together the inside attachment member and the outside attachment member, the anti-vibration device bracket comprising:
   a case that is to be coupled to the vehicle body, that houses the anti-vibration device main body and to which the outside attachment member is fixed, and that has an open side portion on a vertical lateral side of the case and offset from an axial center of the anti-vibration device and which is on the engine-opposite side of the bracket, such that the open side portion is formed with a flange portion that projects outward towards the outer side of the case, and a portion of the inside attachment member projects outward from the open side portion as viewed along a main vibration input direction; and
   a displacement restriction portion that serves as an upper portion of the case, that is formed with a through hole through which passes the inside attachment member that is coupled to the coupling member outside of the case, that is formed with a first displacement restriction face facing the coupling member toward an outer side of the case, and that is formed with a second displacement restriction face facing a portion of the inside attachment member toward an inner side of the case,
   wherein the coupling member coupled to the engine extends away from the axial center of the anti-vibration device.

2. The anti-vibration device bracket of claim 1, wherein the second displacement restriction face is a flat face that extends in an opposite direction to the coupling member.

3. An anti-vibration device, comprising:
   an anti-vibration device main body comprising an inside attachment member that is to extend towards an engine and is to be coupled to a coupling member coupled to the engine, an outside attachment member that is to be coupled to a vehicle body, and a resilient body that is disposed between the inside attachment member and the outside attachment member and that couples together the inside attachment member and the outside attachment member; and
   the anti-vibration device bracket of claim 1, which supports the anti-vibration device main body that is to be on the vehicle body.

4. An anti-vibration device, comprising:
   an anti-vibration device main body comprising an inside attachment member that is to extend towards an engine and is to be coupled to a coupling member coupled to the engine, an outside attachment member that is to be coupled to a vehicle body, and a resilient body that is disposed between the inside attachment member and the outside attachment member and that couples together the inside attachment member and the outside attachment member; and
   the anti-vibration device bracket of claim 2, which supports the anti-vibration device main body that is to be on the vehicle body.

5. The anti-vibration device bracket of claim 1, wherein a side plate portion of the case forms a substantially C-shape as viewed along the main vibration input direction.

6. The anti-vibration device bracket of claim 1, wherein a lower portion of the case is open.

* * * * *